United States Patent
Xu et al.

(10) Patent No.: US 9,794,157 B2
(45) Date of Patent: Oct. 17, 2017

(54) OPTIMAL OPEN LOOP POWER CONTROL FOR RANDOM ACCESS CHANNEL

(71) Applicant: Hughes Network Systems, LLC, Germantown, MD (US)

(72) Inventors: Jun Xu, Takoma Park, MD (US); James Jehong Jong, North Potomac, MD (US); Channasandra Ravishankar, Clarksburg, MD (US)

(73) Assignee: Hughes Network Systems, LLC, Germantown, MD (US)

(*) Notice: Subject to any disclaimer, the term of this patent is extended or adjusted under 35 U.S.C. 154(b) by 104 days.

(21) Appl. No.: 14/813,747

(22) Filed: Jul. 30, 2015

(65) Prior Publication Data
US 2017/0033903 A1    Feb. 2, 2017

(51) Int. Cl.
| | |
|---|---|
| *H04L 12/26* | (2006.01) |
| *H04B 17/336* | (2015.01) |
| *H04W 52/14* | (2009.01) |
| *H04W 52/16* | (2009.01) |
| *H04W 52/22* | (2009.01) |

(52) U.S. Cl.
CPC .......... *H04L 43/16* (2013.01); *H04B 17/336* (2015.01); *H04W 52/146* (2013.01); *H04W 52/16* (2013.01); *H04W 52/225* (2013.01)

(58) Field of Classification Search
CPC ..... H04L 5/0048; H04L 43/16; H04B 17/318; H04B 17/336; H04W 52/146; H04W 52/16; H04W 52/225
USPC .......................................... 370/310, 328, 329
See application file for complete search history.

(56) References Cited

U.S. PATENT DOCUMENTS

| | | | |
|---|---|---|---|
| 6,859,446 B1* | 2/2005 | Gopalakrishnan | H04B 7/264 370/335 |
| 2006/0203921 A1* | 9/2006 | Wang | H04B 7/18543 375/242 |
| 2008/0242339 A1* | 10/2008 | Anderson | H04B 7/18543 455/522 |
| 2011/0007646 A1* | 1/2011 | Miller | H04B 7/18513 370/252 |
| 2015/0085787 A1* | 3/2015 | Ouchi | H04L 5/0037 370/329 |

* cited by examiner

*Primary Examiner* — Obaidul Huq
(74) *Attorney, Agent, or Firm* — Bejin Bieneman PLC

(57) ABSTRACT

A user terminal includes a processing device and a memory storage device. The user terminal is programmed to receive a forward link signal from at least one of a plurality of network devices and transmit a return link signal to the plurality of network devices. The user terminal is further programmed to select one of the plurality of network devices and transmit the return link signal to the selected one of the plurality of network devices at an optimized return link signal transmission strength. The network device is programmed to receive the return link signal from at least one of a plurality of user terminals, determine an initial offset associated with the return link signal, and transmit the initial offset and an original forward pilot to total transmit power ratio over a broadcast channel to the at least one of the plurality of user terminals.

20 Claims, 7 Drawing Sheets

| Summary of Variables ||||||
|---|---|---|---|---|
| Number | Variable | Definition | Expression | Comment |
| 1 | $R_c$ | Equivalent to the spreading rate of the channel. | | |
| 2 | $E_c$ | Average energy accumulated over one PN chip period. | | |
| 3 | $I_{or}$ | The total transmit power spectral density of the Forward CDMA channel at RAN antenna connector. | | |
| 4 | $\hat{I}_{or}$ | The received power spectral density of the Forward CDMA channel as measured at UT antenna connector. | | |
| 6 | $N_0$ | The effective inband noise spectral density. | | |
| 5 | $I_{oc}$ | The power spectral density of interference from other beams plus inband noise density | | |
| 7 | $I_0$ | The total received power spectral density, including signal and interference, as measured at the UT antenna connector. | $I_0 = \hat{I}_{or} + I_{oc}$ | Measured at UT |
| 8 | $N_t$ | The effective noise power spectral density at the UT antenna connector. | $N_t = (1-\varphi)\hat{I}_{or} + I_{oc}$ | $\varphi = 1$ for fully orthogonal |
| 9 | Received Signal Code Power (RSCP) | The received power measured on a code channel. | $E_c R_c$ | Measured at UT |
| 10 | Received Signal Strength Indicator (RSSI) | The wide-band received power within the relevant channel bandwidth. | $I_0 R_c$ | Measured at UT |
| 11 | $\left(\dfrac{E_c}{I_0}\right)_{Pilot}$ | The ratio of the received pilot energy per chip to the total received power spectral density (noise and signals) at the UT antenna connector. | Identical to the ratio of Forward Pilot RSCP and the carrier RSSI | Measured at UT |
| 12 | $\dfrac{E_c}{I_{or}}$ | The ratio of the average transmit energy per PN chip for the Pilot channel to the total transmit power spectral density. | | Broadcast by RAN |
| 13 | $\left(\dfrac{E_c}{N_t}\right)_{Pilot}$ | The ratio of the received pilot energy per chip, $E_c$, to the total effective received noise | Referred to as Forward Pilot SIR | Measured at UT |

FIGURE 2

| Item | Description |
|---|---|
| $\dfrac{1}{P_{Rx}^{UT}}$ | Inverse of total received power which UT needs to measure |
| $\left[\dfrac{E_c^{(p)}}{I_{or}} \cdot \dfrac{1}{(E_c/I_0)}\right]$ | Interference Correction. |
| $[SIR_0 \cdot P_{Tx}^{beam,r} \cdot P_{Rx}^{beam,i}]$ | Initial offset power broadcast by RAN |
| $\left[\dfrac{d_{fwd,I}}{d_{rtn,J}} \cdot \dfrac{g_{(I,J)}}{h_{(I,J)}}\right]$ | Forward and return gain difference adjustment factor. |

FIGURE 3

| RACH Open Loop Simulation Parameters | |
|---|---|
| Parameters | Value |
| Beam Rx Power (dBW) | Mean:-135 / STD: 0.5 |
| Beam Tx Power (dBW) | Mean: 12 / STD: 0.5 |
| Fwd frequency (Hz) | 2.5 G |
| RTN frequency (Hz) | 1.6 G |
| Noise power (dBW) | -140 |
| RACH SIR target (dB) | -22 |
| FWD Pilot to Tx power ratio | 0.10 |
| UT location (Lat, Lon in deg.) | Latitude: 20~60, Longitude: 50~100 |
| UT received power (dBW) | Various mean with STD of 0.0~3.0 |

FIGURE 4

OPTIMAL OPEN LOOP POWER CONTROL FOR RANDOM ACCESS CHANNEL

BACKGROUND

In a satellite network, the "return link" refers to the direction from a user terminal to a gateway via a satellite while the "forward link" refers to the direction from the gateway to the user terminal via the satellite. Return link power control in a mobile satellite system adjusts the user terminal's transmit power to achieve the target signal-to-interference plus noise ratio (SIR) at the radio access network (RAN) (or gateway) receiver. The target SIR corresponds to the desired quality of service (QoS) or target signal quality.

BRIEF DESCRIPTION OF THE DRAWINGS

FIG. 2 is a table showing variables and notations involved in random access channel (RACH) open loop control.

FIG. 3 is a table showing example expressions used for calculating RACH initial power.

FIG. 4 is a table with example simulation parameters for RACH open loop control.

DETAILED DESCRIPTION

Figure 1:
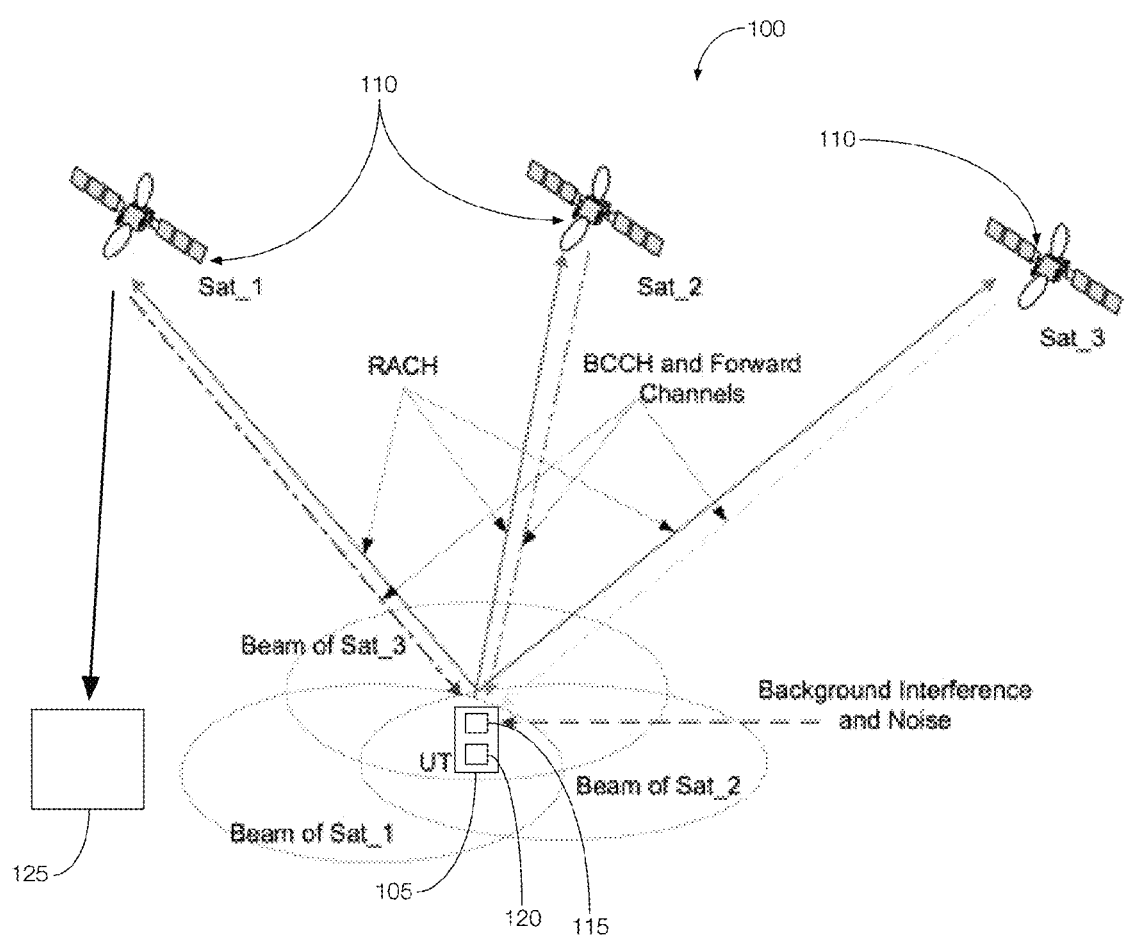
FIG. 1 illustrates an example open-loop telecommunications system.

The return link of a satellite code division multiple access (CDMA) system is interference limited, so the transmit power, if larger than needed, may result in higher interference, causing unnecessary capacity consumption. Conversely, the signal may not be successfully received if the transmit power is insufficient. The user terminal transmitting at the right power level would address these issues and optimize the network's performance.

The transmit power control is an effective way to overcome the propagation loss and interference for meeting the SIR target. The propagation loss includes the path loss due to user terminal-to-satellite distance and small and large scale shadowing. Interference can be caused by multi-user access. Closed loop power control is used for streaming traffic. Open loop power control may be related to the initial setup of the transmit power, which is often based on the reciprocal part of the channel path loss.

A user terminal can initialize a connection to the network by sending a request message on the Random Access Channel (RACH) at the return link. The RACH may also be used to send the packet data of a short message. On the one hand, if the transmit power is too high, the RACH may create interference, which can impact the return link capacity. On the other hand, if the transmit power is too low, the initial access attempt may fail, requiring retransmissions that slow down the access procedure because of the long round-trip delay in the satellite system despite allowing multiple retransmissions. Thus, appropriate initial power is desired for the successful transmission of the RACH based on open loop power control.

Traditionally, the open loop power setting for a CDMA-based satellite network is based on terrestrial IS-95 standard, which does not account for return link interference. In addition, the network does not know the location (through, e.g., GPS) of a user terminal; thus the propagation or antenna gain is not used in setting up the initial power in the IS-95 standard.

Additional problems may arise when implementing existing techniques used in a CDMA based mobile satellite system using IS-95. First, inaccurate initial power may cause extra interference if the setting is too high or multiple roundtrips if the initial setting is too low. The former downplays the system capacity while the latter degrades the latency performance. Second, a mobile satellite system may have asymmetrical beam coverage and link gains at the return and forward directions, and such asymmetry may cause insufficient or over allotment of RACH transmit power when using the reciprocal of received power. Third, given the satellite constellation, especially in a low earth orbit (LEO) satellite system, there can be multiple satellites in the view of a user terminal, and the transmitted RAN may be received by multiple satellites simultaneously. Because the interference level at a specific beam of a satellite may vary, the signal quality of the received RACH at different satellites can be different. As described in greater detail below, the disclosed user terminal can optimize the RACH power to satisfy one of the satellites with a judicious approach to minimize the interference.

Previous techniques used to compensate for interference cannot be used in satellite systems because, among other reasons, the return and forward beams are not symmetric. The disclosed telecommunications system, which can be implemented in a mobile CDMA LEO system, effectively considers both forward and return interference to determine the optimal initial RACH power in a multiple satellite environment.

Various components of the disclosed telecommunications system can: (1) quantify the forward link interference and estimate the interference correction of the return link; (2) compensate the antenna and link gain differences due to asymmetry of beam coverage; (3) judiciously target one satellite with optimal power settings; (4) approximate the received signal strength at the user terminal; (5) and provide optimized open loop power for RACH. The open loop initial power setting can be set just enough for successfully transmitting RACH while at the same time minimizing the interference An example open loop telecommunications system includes a user terminal having a processing device and a memory storage device. The user terminal is programmed to receive a forward link signal from at least one of a plurality of network devices, such as a satellite, and transmit a return link signal to the plurality of network devices. The user terminal is further programmed to select one of the plurality of network devices and transmit the return link signal to the selected one of the plurality of network devices at a minimum return link signal transmission strength. This user terminal can provide optimal RACH initial power setup in a CDMA based mobile satellite network.

In one possible implementation, the open-loop telecommunications system may operate as follows. The network may broadcast the information of return beam interference and required SIR in the Broadcast Channel (BCCH) of each forward beam. The BCCH may also contain the forward pilot power level, which can be constant over time, and the total transmit power of the forward beam. The information may be provided by the radio access network in the format of the ratio of forward pilot and the total transmit power and the initial RACH power offset. The user terminal may measure the total received mean power including forward interference and noise periodically. In addition, the received pilot power and pilot SIR of the forward beam with signal quality higher than a threshold are measured. Meanwhile, the user terminal may also listen to BCCH to acquire the related information for RACH open loop. The user terminal may camp on a single beam with the strongest pilot SIR in the overall system or read BCCH associated with the strongest pilot of each visible satellite. By doing so, the user terminal may be able to calculate the needed RACH power for a return beam addressed by corresponding forward beam. If the user terminal camps on a forward beam with strongest overall pilot SIR, the calculated RACH power may be able to meet the QoS for at least one satellite. If the user terminal listens to multiple BCCH, among the calculated RACH powers, the smallest can be used which assures one successful RACH transmission. To overcome issues associated with asymmetry, the difference of forward and return link gains may be calculated by the user terminal and applied to the RACH initial power. Therefore, there may be four actions associated with determining RACH power setup. The actions may include determining or identifying: (1) the reciprocal of total received power, (2) the initial RACH power offset, (3) the interference correction, and (4) the gain adjustment.

The disclosed telecommunications system is applicable to a CDMA satellite system where return link signals can be received by multiple beams of multiple satellites, and certain concepts may be extended to general terrestrial CDMA systems where a user terminal is covered by multiple base stations and where there exist asymmetric forward and return link gains.

The elements shown may take many different forms and include multiple and/or alternate components and facilities. The example components illustrated are not intended to be limiting. Indeed, additional or alternative components and/or implementations may be used.

As illustrated in FIG. 1, the open-loop telecommunications system 100 includes a user terminal 105 in communication with multiple network devices such as satellites 110. The user terminal 105 may include any electronic device with a processing device 115 and a memory storage device 120. The user terminal 105 may be programmed to receive a forward link signal from, and transmit a return link signal to, one or more of the satellites 110. In instances where multiple satellites 110 are within communication range of the user terminal 105, the user terminal 105 may be programmed to select one of the satellites 110 for communication. Thus, the return link signal may be transmitted only to the selected satellite 110 as opposed to all satellites 110 within the communication range. Moreover, as discussed in greater detail below, the user terminal 105 may transmit the return link signal at a minimum strength, referred to as the "optimized return link signal transmission strength," over a random access channel (RACH).

The user terminal 105 may be programmed to select among the satellites 110 based, at least in part, on a signal-to-interference plus noise ratio (SIR) strength associated with each of the satellites 110 in the communication range of the user terminal 105. In one possible approach, the user terminal 105 may be programmed to select the satellite 110 with the highest SIR strength. The user terminal 105 need not consider all satellites 110 in the communication range, however. For instance, the user terminal 105 may be programmed to monitor the BCCH for signals transmitted by the satellites 110 and only select among those with a signal strength above a strength threshold.

In one possible approach, the user terminal 105 may be programmed to measure a total received mean power associated with the forward link signal. The total received mean power may represent interference and noise associated with the forward link signal. The user terminal 105 may be further programmed to measure a received pilot power and a received SIR of the forward link signal. The user terminal 105 may be programmed to compare a quality associated with the forward link signal to a threshold and measure the received pilot power and the received SIR of the forward link signal if the quality of the forward link signal exceeds the threshold. Moreover, the user terminal 105 may be programmed to receive an interference signal transmitted over a broadcast channel (BCCH) by one or more of the satellites 110.

To account for asymmetry, the user terminal 105 may be programmed to determine link gains associated with the return link signal and the forward link signal. The user terminal 105 may be further programmed to determine a link gain difference from, e.g., the difference between the link gains associated with the return link signal and the forward link signal.

The satellite 110 may include any object in orbit of the Earth and configured to communicate with the user terminal 105 in accordance with any number of communication protocols. An example communication protocol may include the code division multiple access (CDMA) protocol. The satellite 110 may be programmed to receive the return link signal from a user terminal 105, and transmit the return link to a gateway 125 or another network device. The satellite 110 may, in some possible implementations, be programmed to determine a return beam interference associated with the return link signal and transmit an interference signal representing the return beam interference to the user terminal 105. The interference signal may further represent other information such as, e.g., a forward pilot power level, a total transmit power associated with the forward link signal, a ratio of a forward pilot power level to a total transmit power of the forward link signal or to an initial RACH power offset, or the like.

The satellite 110 may be programmed to communicate over any number of channels. For instance, the satellite 110 may be programmed to receive the return link signal via the RACH and transmit the interference signal over the BCCH.

With continued reference to FIG. 1, the return link RACH may used for communication from the user terminal 105 to the radio access network when no traffic channel is assigned. The RACH may be referred to as such because the user terminal 105 may access the radio access network (RAN) without explicit bandwidth authorization by the RAN. If the RACH is successfully used to access the RAN, open-loop power control may be implemented, including initial power setup and ramp-up procedures for retransmissions.

In operation, the user terminal 105 may read a message for the RACH open loop carried by the BCCH. The user terminal 105 may assume related forward link measurements to determine the needed RACH power. The transmitted power from the satellites 110, as well as background noise and terrestrial interference sources, can create interference at the forward link of the user terminal 105. The user terminal 105 may communicate over the RACH via a target beam of one of the visible satellites 110. The transmitted RACH signal may be received by multiple return beams of the visible satellites 110. Because the received power level and return interference at different beams are different, different beams may have different received RACH signal quality.

As previously discussed, the described RACH open loop control protocol can be used to control the power at which signals are transmitted over the RACH to increase the likelihood of a RACH transmission. For example, the user terminal 105 may, e.g., is to determine the initial power in the RACH open loop such that the received SIR at a desired beam satisfies the target. This open-loop approach involves the measuring of the mean total received power, the received Forward Pilot power from visible satellites 110 (beams), the pilots' signal-to-interference ratio (SIR), and setting the transmit power until the RACH signal is successfully received by the RAN.

With reference to FIG. 1, the variables identified in FIG. 2, and the expressions and descriptions presented in FIG. 3, consider a serving forward (FWD) reference satellite 110 (denoted as "Sat_1" in FIG. 1) with a total number of K visible satellites 110. Each satellite 110 has M FWD beams. Denoting the chip rate as $R_c$, the forward link transmission loss (gain) is represented by $L_{FWD}$, the user terminal 105 total received power is represented as $P_{Rx}^{UT}$, and the total transmit power from beam j of satellite k is $P_{Tx}^{beam(j,k)}$ where j=1, ... M, k=1, ..., K. Let the total transmit power from the serving reference beam (of the serving satellite 110) be $P_{Tx}^{beam(r)}$. Without loss of generality, assume the serving forward satellite beam is one beam of the reference satellite, i.e., $P_{Tx}^{beam(r)} = P_{Tx}^{beam(1,1)}$.

The total user terminal 105 received power can be expressed as:

$$P_{Rx}^{UT} = P_{Tx}^{beam(1,1)} \cdot L_{FWD} + I_{oc} R_c \quad (1)$$

$$= P_{Tx}^{beam(1,1)} d_{fwd,1} g_{1,1} + \sum_{i=2}^{M} P_{Tx}^{beam(i,1)} d_{fwd,1} g_{i,1} +$$

$$\sum_{k=2}^{K} \sum_{j=1}^{M} P_{Tx}^{beam(j,k)} d_{fwd,k} g_{j,k} + N_0 R_c$$

$$= P_{Tx}^{beam,r} d_{fwd,1} g_{1,1} \left(1 + \frac{I_{oc}}{\hat{I}_{or}}\right).$$

In Equation (1), $d^{fwd,k}$ is the forward path-loss from satellite k; $g_{j,k}$ is the forward antenna gain of the jth beam of the kth satellite (again, j=1, ... M, k=1, ..., K; $I_{oc}$ represents the interference plus noise power spectral density due to other beams of the serving satellite and other satellites, as well as other interference sources; $\hat{I}_{or}$ is the received power spectral density from the serving reference beam.

$\hat{I}_{or}$ can be further written as $$\hat{I}_{or} = \frac{P_{Tx}^{beam,r}}{R_c} d_{fwd,1} g_{1,1} = I_{or} \cdot L_{FWD} \quad (2)$$

where $L_{FWD} = d_{wd,1} g_{1,1}$ and $\hat{I}_{or}$ is the transmit chip energy at the serving beam. Let $L_{FWD}^{(j,k)} = d_{fwd,k} g_{j,k}$. Because $$P_{Rx}^{UT} = P_{Tx}^{beam,r} L_{FWD}^{(1,1)} \left(1 + \frac{I_{oc}}{\hat{I}_{or}}\right), \text{thus} \quad (3)$$

$$L_{FWD}^{(1,1)} = \frac{P_{Rx}^{UT}}{P_{Tx}^{beam,r} \left(1 + I_{oc}/\hat{I}_{or}\right)}.$$

Let $L_{RTN}^{(q,1)} = d_{rtn,1} h_{q,1}$ be the return link transmission loss (gain) for the serving reference RTN beam (assuming Return Beam q of the reference Satellite), where $d_{rtn,1}$ is the return path-loss and $h_{q,1}$ is the antenna gain at return Beam q of the reference satellite.

At the return link, the received SIR satisfying the target SIR can be expressed as $$SIR = \frac{P_{Tx}^{UT} L_{RTN}^{(q,1)}}{P_{Rx}^{beam,q} - P_{Tx}^{UT} L_{RTN}} \approx \frac{P_{Tx}^{UT} L_{RTN}^{(q,1)}}{P_{Rx}^{beam,q}} \geq SIR_0, \quad (4)$$

where $P_{Rx}^{beam,q}$ is the total received power of return Beam q including noise and $SIR_0$ the desired target. $P_{Rx}^{beam,q}$ is also referred to as the total interference power at the return link of Beam q. It can be estimated at the gateway 125 receiver.

The relative difference of transmission loss between the return and forward link with same satellite 110 is $$\lambda = \frac{L_{FWD}^{(1,1)}}{L_{RTN}^{(q,1)}} = \frac{d_{fwd,1}}{d_{rtn,1}} \cdot \frac{g_{(1,1)}}{h_{(q,1)}}. \quad (5)$$

The required user terminal transmit power $P_{Tx}^{UT}$ is $$P_{Tx}^{UT} \geq \frac{SIR_0 \cdot P_{Rx}^{beam,q}}{L_{RTN}^{(q,1)}} = \frac{1}{P_{Rx}^{UT}} \left[\frac{d_{fwd,1}}{d_{rtn,1}} \cdot \frac{g_{(1,1)}}{h_{(q,1)}}\right] [1 + I_{oc}/\hat{I}_{or}] \cdot \quad (6)$$

$$SIR_0 \cdot P_{Tx}^{beam,r} \cdot P_{Rx}^{beam,q} \cdot \left(1 - \frac{P_{Tx}^{UT} L_{RTN}}{P_{Rx}^{beam,q}}\right).$$

It can be found that $$\left(1 + I_{oc}/\hat{I}_{or}\right) = \frac{E_c^{(p)}}{I_{or}} \cdot \frac{1}{(E_c/I_0)}. \quad (7)$$

Thus, the user terminal 105 transmit power of Equation (6) can be written as $$P_{Tx}^{UT} = \frac{1}{P_{Rx}^{UT}} \left[\frac{d_{fwd,1}}{d_{rtn,1}} \cdot \frac{g_{(1,1)}}{h_{(q,1)}}\right] \left[\frac{E_c^{(p)}}{I_{or}} \cdot \frac{1}{(E_c/I_0)}\right] \cdot \quad (8)$$

$$\left[SIR_0 \cdot P_{Tx}^{beam,r} \cdot P_{Rx}^{beam,q} \left(1 - \frac{P_{Tx}^{UT} L_{RTN}}{P_{Rx}^{beam,q}}\right)\right]$$

In Equation (8), the user terminal 105 transmit power is divided into four parts. The expression $$\frac{1}{P_{Rx}^{UT}}$$

(i.e., the inverse of $P_{Rx}^{UT}$ which is measured at the user terminal 105 antenna) represents the mean input power and is averaged, for example, for 200 ms. The expression $P_{Rx}^{UT}$ may be referred to as Mean_Rx_Power. The expression $$\left[\frac{E_c^{(p)}}{I_{or}} \cdot \frac{1}{(E_c/I_0)}\right]$$

may refer to interference correction, denoted as IC_Correction. The expression $$\frac{E_c^{(p)}}{I_{or}}$$

may refer to the pilot to transmit power ratio and may be broadcast by the RAN via the broadcast channel (BCCH). The pilot to transmit power ratio can be time varying, so the value may be updated periodically. The expression $(E_c/I_0)$ may represent the ratio of the received pilot energy per chip to the total received power spectral density (noise and signals) at the user terminal 105 antenna connector. Thus, the expression $(E_c/I_0)$ may be measured by the user terminal 105. The expression $$\left[SIR_0 \cdot P_{Tx}^{beam,r} \cdot P_{Rx}^{beam,q} \cdot \left(1 - \frac{P_{Tx}^{UT} L_{RTN}}{P_{Rx}^{beam,q}}\right)\right]$$

may represent the initial offset power broadcast by the RAN, denoted as RACH_INIT_OFFSET. Among this part, the target SIR and FWD beam transmit power may be known to the RAN, $P_{Rx}^{beam,q}$ may be the RTN beam interference estimated by the RAN. The expression $$\frac{P_{Tx}^{UT} L_{RTN}}{P_{Rx}^{beam,q}}$$

may be the measured SIR on the respective return beam channel. The expression $$\left[\frac{d_{fwd,1}}{d_{rtn,1}} \cdot \frac{g_{(1,1)}}{h_{(q,1)}}\right]$$

may represent link again adjustment (Gain_Adjustment). The path loss may include free space loss and shadowing. For $$\frac{d_{fwd,1}}{d_{rtn,1}},$$

shadowing is apparently cancelled. Given the locations of the user terminal 105 and the satellite 110, the free space loss and antenna gain at both links are known to user terminal 105, thus the gain adjustment.

Because the user terminal 105 in coverage of one forward beam may correspond to multiple return beams, information pertaining to multiple return beams may be transmitted in the forward link. One way includes broadcasting the information for each individual return beam associated with the forward beam. Another way includes computing an average interference metric in the RAN for the multiple return beams that intersect a forward beam that is transmitted over the BCCH.

The aforementioned analysis and algorithm is summarized as the following procedure. Let Mean_Rx_Power denote the mean total received power, RACH_INIT_OFFSET the initial offset power correction, IC_Correction the interference correction, Gain_Adjustment the link gain adjustment, then the mean initial RACH output power (the composite RACH transmit power) can be expressed as Mean_RACH_Initial_output_power
    (dBm)=−Mean_Rx_Power (dBm)+IC_Correction+RACH_INIT_OFFSET+Gain_Adjustment         (9)

To avoid measurement error causing excessive interference correction, upper and lower limits can be applied. Let IC_MAX be the configured maximum allowed interference correction value. IC_Correction can be further expressed as $$\text{IC\_Correction(dB)} = \min\left[\max\left(\frac{E_c^{(p)}}{I_{or}} \cdot \frac{1}{(E_c/I_0)}, 0\right), \text{IC\_MAX}\right]. \quad (10)$$

A default value of IC_MAX can be obtained via Monte Carlo simulation. For instance, in a CDMA LEO satellite constellation, the default value of 9 (dB) can be used. The ultimate RACH initial power may determined as follows. If the user terminal 105 camps on the overall strongest pilot among forward beams, the initial power may be determined based on the BCCH from this beam using Equation (9). This may be referred to as Strongest Pilot method. If the user terminal 105 can read messages from a desired corresponding forward BCCH in each individual visible satellite 110, the user terminal 105 may determine the initial RACH power using Equation (9) for the targeted return beam for each individual satellite 110 and choose the smallest power for RACH transmission. This may be referred to as the Judicious method.

Because the interference at each return beam may vary, and BCCH from a FWD beam could address multiple RTN beams, the average interference of RTN beams that associate with the FWD beam may be used if the gateway 125 can only provide one return link interference value. The following provides the analysis and simulation to investigate the effect.

Suppose that there are L RTN beams addressed by one FWD beam. Let $L_{RTN,Lower}$ and $L_{RTN,Upper}$ (in dB) be the respective lower and upper limits of RTN interference range (for a certain time period). Assume the interference of one individual RTN beam is uniformly distributed between $L_{RTN,Upper}$ and $L_{RTN,Upper}$. Denote $x_{ij}$ (dB) the random variable representing the RTN interference for beam j at time i, j=1, ..., L, i=1, ..., M. L is the number of return link beams that overlap with the forward link beam. M is the predefined time period. The average interference (in dB) among L RTN beams is $$\bar{x}_i = \sum_{j=1}^{L} x_{ij}/L$$

at time i.

If differential interference is defined as $d_{ij}=x_{ij}-\bar{x}_i$, the mean of $d_{ij}$ is $$E(d_{ij})=E(x_{ij})-E(\bar{x}_i)=0. \quad (11)$$

Denote $d_{max}=L_{RTN,Upper}-L_{RTN,Lower}$. Because $d_{ij}$ lies in between $-d_{max}$ and $d_{max}$, and may not be uniformly distributed, the standard deviation (STD) can be found by simulation. Table 1 tabulates the standard deviation of deferential interference. As comparison, the standard deviation of uniform distribution of corresponding range is also provided and shows a good agreement.

TABLE 1

| | STD of Differential Interference | | | | | |
|---|---|---|---|---|---|---|
| $d_{max}$ | 1 | 2 | 3 | 4 | 5 | 6 |
| STD ($d_{ij}$) | 0.249 | 0.50 | 0.957 | 1.00 | 1.25 | 1.50 |
| STD (uniform distribution of $[-d_{max}, d_{max}]$ | 0.289 | 0.577 | 0.866 | 1.154 | 1.443 | 1.732 |

The user terminal received total power may also be referred to as Received Signal Strength Indication (RSSI). The disclosed open loop power control uses the user terminal 105 to measure RSSI in real time (i.e., Mean_Rx_Power in Equation (9)). Sometimes there may be a concern that RSSI measured by the user terminal 105 may lose accuracy due to any HW gain variation in the user terminal 105, which could be up to +/−9 dB. Given that noise level of the user terminal 105 can be determined, typically with error range of [−2, +2] dB, an alternative method for RSSI calibration can be used when the direct RSSI measurement has high errors.

The RSSI may be the sum of noise, pilot, intra-beam channels interference, inter-beam interference, and inter-satellite interference power given by $$RSSI=P_P+P_I+P_N=P_P+P_N(1+\beta), \quad (12)$$

where $P_P$ is the received pilot power, $\beta=P_I/P_N$ is the ratio of total interference and system noise. Further, RSSI can be expressed as $$RSSI=P_N(1+\beta)(1+SIR_{Pilot}), \quad (13)$$

where $SIR_{Pilot}=P_P/P_N$ is the signal to noise ratio of the pilot. The RSSI can be estimated based upon the knowledge of noise level and reported pilot SIR and satellite beam interferences. For simplicity of implementation or when the pilot SIR is not available, the above expression can be further simplified to $$RSSI \approx P_N(1+\beta) \quad (14)$$

because the pilot SIR is typically below −18 dB (i.e., $SIR_{Pilot} \ll 1$).

Let $\beta$ be composed of the portions of intra-beam interference and inter-beam/inter-satellite interference, denoted as $\beta_1$ and $\beta_2$, respectively. So given $P_N$ can be measured and relatively consistent over time, a reasonably accurate estimation of $\beta$ could provide a reasonably more accurate RSSI in case the direct measurement of RSSI loses accuracy due the fluctuation of hardware gain inside the terminal due to temperatures, humidity, etc. $\beta$ may have strong correlation with the forward beam transmit power which is known to the RAN, which can evaluate $\beta$ by setting various values of the forward beam transmit power by simulation or lab experiments. The RAN can broadcast $\beta$ values with varying forward beam transmit power during operation. This can improve the estimation of RSSI. When the RAN cannot broadcast $\beta$ values, or the recent $\beta$ value is not available, the user terminal 105 can still use the old $\beta$ value or use a default value stored in its memory. The default value can be found through simulation or field data. For example, in the case of a typical operation with (1+$\beta$) between 0.45 dB to 3 dB, a setting of default value by 1.725 dB results in +/−1.275 dB error.

Figure 5:
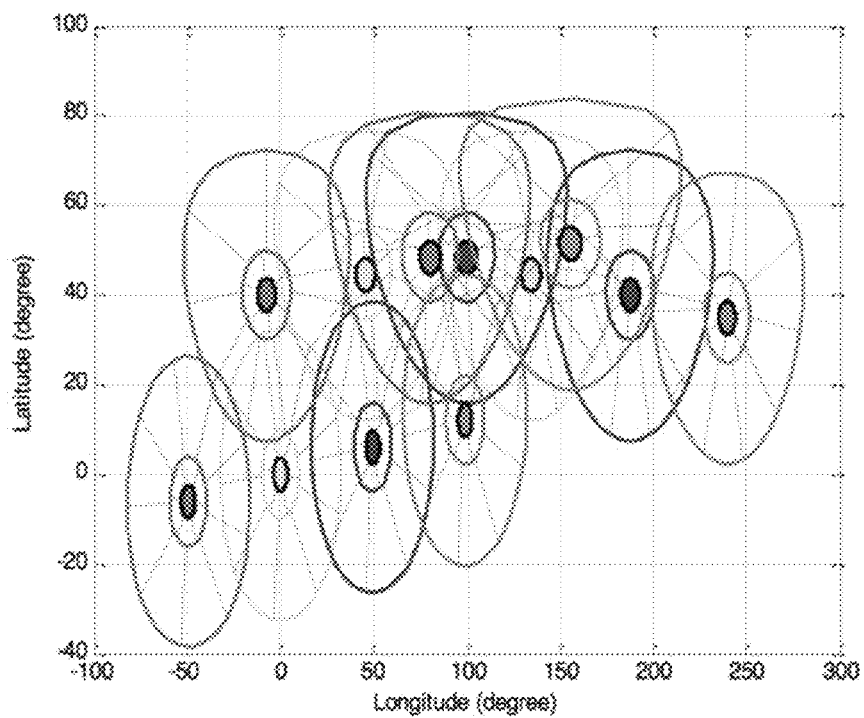
FIG. 5 illustrates represents forward beams of example satellite constellations.
Figure 6:
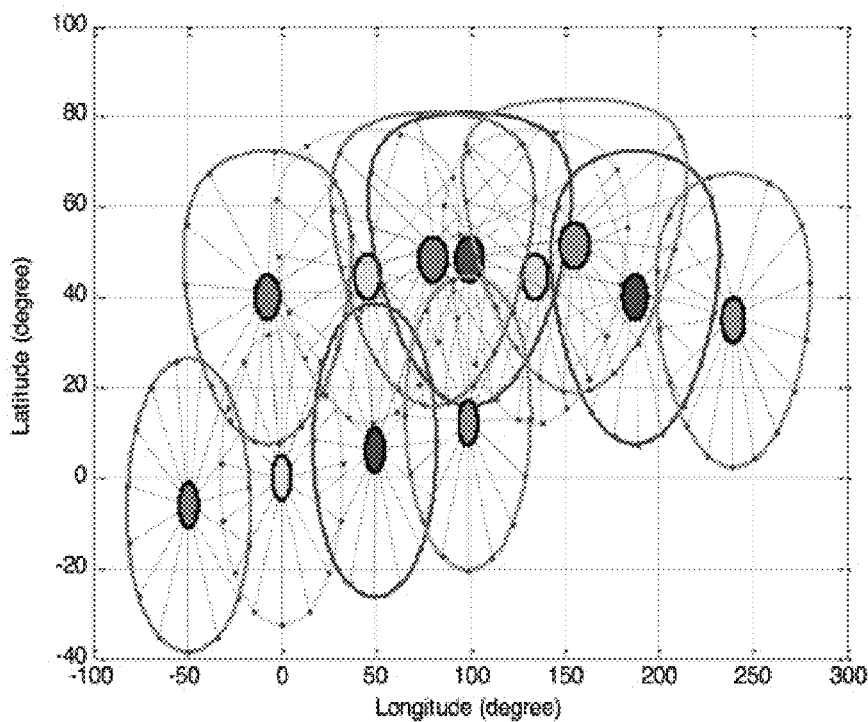
FIG. 6 illustrates presents return beams of example satellite constellations.

Monte Carlo simulations can be conducted to test this open loop implementation assuming particular satellite 110 positions such as those shown in FIG. 4 with example satellite constellations shown in FIG. 5 and FIG. 6 respectively. As listed in the example parameters shown in FIG. 4, the received power at each return beam can have a −135 dBW mean value and a standard deviation (STD) of 0.5. The average total transmit power, as shown, is 12 dBW with standard deviation of 0.5. The minimum elevation angle is 7 degrees. The forward pilot to total transmit power ratio is 0.10. The example beams and satellite constellation used in simulation are shown in FIGS. 5 and 6 for forward and return links, respectively. The user terminal 105 is randomly positioned among the area of Latitude 20 to 60 degree and Longitude 50 to 100 degree. In this example approach, the user terminal 105 may see up to four satellites 110. Without loss of generality, the measurement error is assumed with the user terminal 105 received power which has a standard deviation of 0 to 3 dB. Additional parameters are also listed in FIG. 4.

In the multi-satellite environment, the user terminal 105 may receive multiple pilots with forward beams from different satellites 110, and there could be more than one beam providing a strong pilot. Under the Maximum Pilot approach, the user terminal 105 may measure the received pilot strength from forward beams and calculate the needed RACH initial power for a return beam which corresponds to the forward beam with strongest pilot. Under the Judicious approach, the user terminal 105 may measure the received pilot strength from forward beams and calculate the needed minimum RACH initial power sufficient for each of corresponding return beams. The user terminal 105 may transmit RACH with the lowest calculated power.

Figure 7:
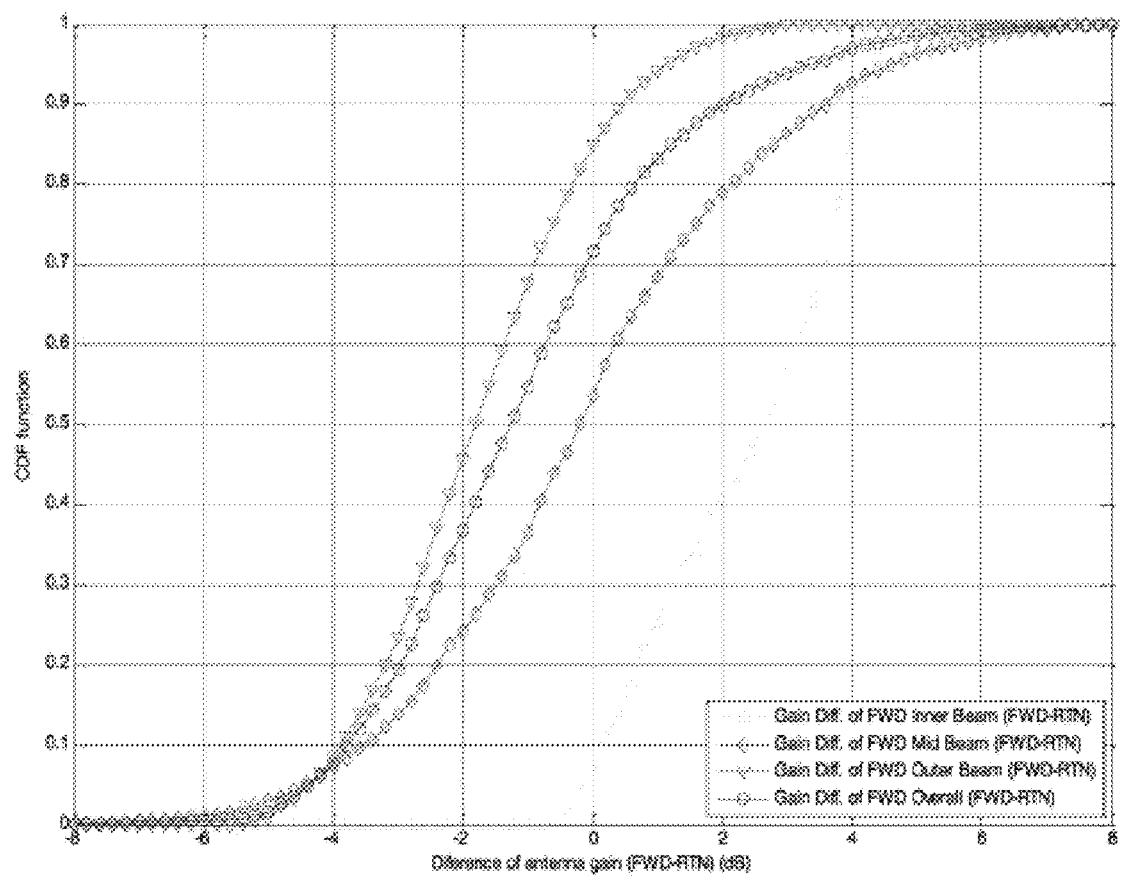
FIG. 7 is a graph illustrating an example cumulative distribution function (CDF) of a link gain difference relative to the constellations of FIGS. 6 and 7.
Figure 8:
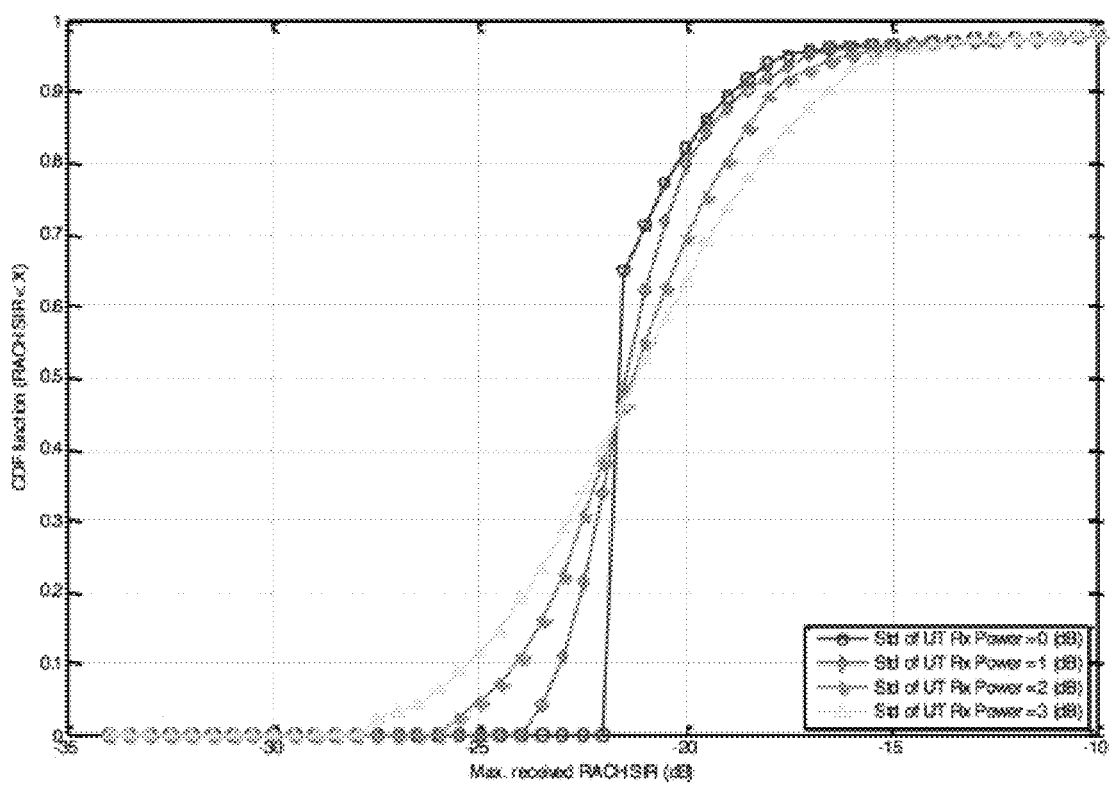
FIG. 8 shows example simulated RACH performance when a user terminal camps on the strongest pilot.
Figure 9:
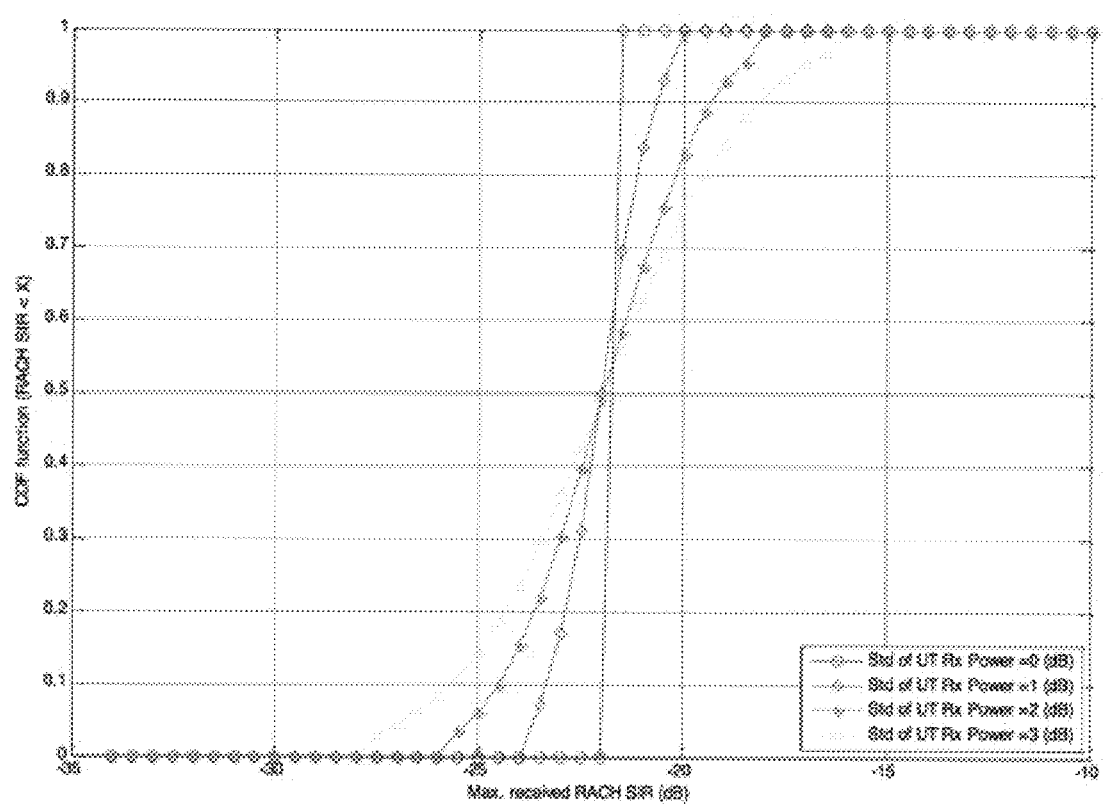
FIG. 9 shows example simulated RACH performance when a user terminal communicates using the minimum required power.

FIG. 7 illustrates the cumulative distribution function (CDF) of the antenna gain difference using the forward beam gain minus the corresponding return beam gain for the same satellite 110. This may help to determine the beam gain adjustment when the user terminal 105 location is unknown. Simulation results based on the Maximum Pilot and Judicious Methods are shown in FIG. 8 and FIG. 9, respectively. In FIG. 8, RACH performance is shown, in terms of the cumulative probability function (CDF) of SIR larger than a threshold (target) when the user terminal 105 camps on the strongest forward pilot. In FIG. 9, RACH performance is shown, in terms of CDF of SIR larger than a threshold (target) when using Minimum Required Power.

In general, the computing systems and/or devices described may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A user terminal comprising a processing device and a memory storage device, wherein the user terminal is programmed to:
   receive a forward link signal from at least one of a plurality of network devices and transmit a return link signal to the plurality of network devices,
   select one of the plurality of network devices,
   determine an optimized return link transmit power based at least in part on a total received mean power of the forward link signal, a calculated forward interference correction, an initial offset provided by the network, and a gain adjustment, and
   transmit the return link signal to the selected one of the plurality of network devices at the optimized return link signal transmission strength,
   wherein the total received mean power represents interference and noise associated with the forward link signal and wherein the interference associated with the forward link signal is represented by a configured multiple of a fixed noise level.

2. The user terminal of claim 1, wherein the interference associated with the forward link is represented by a configured multiple of a fixed noise level.

3. The user terminal of claim 1, wherein the user terminal is programmed to compensate for forward link interference when transmitting the return link signal based on the calculated forward interference correction.

4. The user terminal of claim 3, wherein the user terminal is programmed to measure a received signal-to-interference plus noise ratio of a forward link pilot signal.

5. The user terminal of claim 4, wherein the user terminal is programmed to calculate the forward interference correction using a difference between an original transmit pilot power and a total transmit power ratio and the received signal-to-interference plus noise ratio.

6. The user terminal of claim 5, wherein the user terminal is programmed to limit the calculated interference correction to a threshold.

7. The user terminal of claim 1, wherein the user terminal is programmed to receive an initial offset to a return link transmit power transmitted over a broadcast channel by at least one of the plurality of network devices.

8. The user terminal of claim 1, wherein the user terminal is programmed to select among the plurality of network devices based at least in part on a signal-to-interference plus noise ratio strength associated with each of the plurality of network devices, wherein the user terminal is programmed to select the network device, among the plurality of network devices, with a highest forward link pilot signal-to-interference plus noise ratio.

9. The user terminal of claim 8, wherein the user terminal is programmed to monitor a broadcast channel for pilot signals transmitted by the plurality of network devices, wherein the user terminal calculates a needed return link power with a signal strength above a threshold.

10. The user terminal of claim 1, wherein the user terminal is programmed to target one of the plurality of network devices by determining a minimum needed return link signal transmission strength for at least one of the plurality of network devices and select the smallest optimized return link signal transmission power for transmitting the return link signal over a random access channel.

11. The user terminal of claim 1, wherein the user terminal is programmed to determine a link gain associated with the return link signal and the forward link signal and determine a link gain difference based on a difference between the link gains associated with the return link signal and the forward link signal.

12. A network device comprising a processing device and a data storage medium, wherein the network device is programmed to:
receive a return link signal from at least one of a plurality of user terminals,
determine an initial offset associated with the return link signal, and
transmit the initial offset and an original forward pilot to total transmit power ratio over a broadcast channel to the at least one of the plurality of user terminals, wherein the initial offset is calculated by the network device based on a configured target of a return link signal to interference ratio, a total forward transmit power, a measurement of a return link interference, and a received return link signal to interference ratio.

13. The network device of claim 12, wherein the network device is programmed to estimate the return link interference and measure the received return link signal to interference ratio.

14. The network device of claim 12, wherein the interference signal further represents a ratio of a forward pilot power level to at least one of a total transmit power of the forward link signal and an initial random access channel power offset.

15. The network device of claim 14, wherein the initial offset and the original forward pilot to total power ratio is transmitted by the network device.

16. The network device of claim 12, wherein the network device includes at least one of a gateway and a satellite.

17. A telecommunications system comprising:
a user terminal programmed to receive a forward link signal and transmit a return link signal at an optimized return link signal transmission strength; and
a network device programmed to receive the return link signal from the user terminal, determine an initial offset associated with the return link signal, and transmit the initial offset and an original forward pilot to total transmit power ratio over a broadcast channel to the user terminal,
wherein the user terminal is programmed to determine the optimized return link signal transmission strength based at least in part on the initial offset and the original forward pilot to total transmit power ratio transmitted by the network device, and
wherein the initial offset is calculated by the network device based on a configured target of a return link signal to interference ratio, a total forward transmit power, a measurement of a return link interference, and a received return link signal to interference ratio.

18. A user terminal comprising a processing device and a memory storage device, wherein the user terminal is programmed to:
receive a forward link signal from at least one of a plurality of network devices and transmit a return link signal to the plurality of network devices,
select one of the plurality of network devices,
determine an optimized return link transmit power based at least in part on a total received mean power of the forward link signal, a calculated forward interference correction, an initial offset provided by the network, and a gain adjustment,
compensate for forward link interference when transmitting the return link signal based on the calculated forward interference correction, wherein compensating for forward link interference includes measuring a received signal-to-interference plus noise ratio of a forward link pilot signal and calculating the forward interference correction using a difference between an original transmit pilot power and a total transmit power ratio and the received signal-to-interference plus noise ratio, and
transmit the return link signal to the selected one of the plurality of network devices at the optimized return link signal transmission strength.

19. A user terminal comprising a processing device and a memory storage device, wherein the user terminal is programmed to:
receive a forward link signal from at least one of a plurality of network devices and transmit a return link signal to the plurality of network devices,
determine a minimum needed return link signal transmission strength for at least one of the plurality of network devices,
select the smallest optimized return link signal transmission power for transmitting the return link signal over a random access channel, and select one of the plurality of network devices, transmit the return link signal to the selected one of the plurality of network devices at an optimized return link signal transmission strength.

20. A user terminal comprising a processing device and a memory storage device, wherein the user terminal is programmed to:

receive a forward link signal from at least one of a plurality of network devices and transmit a return link signal to the plurality of network devices, select one of the plurality of network devices, determine a link gain associated with the return link signal and the forward link signal, determine a link gain difference based on a difference between the link gains associated with the return link signal and the forward link signal, and transmit the return link signal to the selected one of the plurality of network devices at an optimized return link signal transmission strength.

* * * * *